(12) United States Patent
He et al.

(10) Patent No.: US 12,517,811 B2
(45) Date of Patent: Jan. 6, 2026

(54) METHOD, SYSTEM AND DEVICE FOR GENERATING TEST CASE FOR AUTOMOTIVE CYBERSECURITY DETECTION

(71) Applicant: CATARC Software Testing (Tianjin) Co., Ltd, Tianjin (CN)

(72) Inventors: Kexun He, Tianjin (CN); Baotian Li, Tianjin (CN); Xuebin Shao, Tianjin (CN); Yanyan Han, Tianjin (CN); Yihong Qin, Tianjin (CN); Baizheng Wang, Tianjin (CN); Wen Shao, Tianjin (CN)

(73) Assignee: CATARC SOFTWARE TESTING (TIANJIN) CO., LTD, Tianjin (CN)

( * ) Notice: Subject to any disclaimer, the term of this patent is extended or adjusted under 35 U.S.C. 154(b) by 161 days.

(21) Appl. No.: 18/416,960

(22) Filed: Jan. 19, 2024

(65) Prior Publication Data

US 2024/0264929 A1 Aug. 8, 2024

(30) Foreign Application Priority Data

Feb. 6, 2023 (CN) .......................... 202310081916.3

(51) Int. Cl.
G06F 9/44 (2018.01)
G06F 11/3668 (2025.01)

(52) U.S. Cl.
CPC ...... G06F 11/3688 (2013.01); G06F 11/3684 (2013.01)

(58) Field of Classification Search
CPC .......................... G06F 11/3688; G06F 11/3684
See application file for complete search history.

(56) References Cited

U.S. PATENT DOCUMENTS

2022/0019676 A1* 1/2022 Guo ...................... G06F 21/577
2022/0150270 A1* 5/2022 Klein .................. G06F 11/3457
(Continued)

FOREIGN PATENT DOCUMENTS

CN 106209817 A 12/2016
CN 112329022 A 2/2021
(Continued)

OTHER PUBLICATIONS

First Office Action and Search in Corresponding Chinese Application No. 202310081916.3, dated Apr. 14, 2023; 9 ogs.
(Continued)

Primary Examiner — Bradley A Teets
Assistant Examiner — Lenin Paulino
(74) Attorney, Agent, or Firm — PORUS IP LLC

(57) ABSTRACT

The disclosure provides a method, a system and a device for generating test case for automotive cybersecurity detection, which are mainly for regulatory detection of automotive cybersecurity, and applicable to automobile security detection and authentication based on an automotive cybersecurity development flow. The present disclosure constructs an attack vector by splitting an impact parameter of a risk to determine a vector value that contributes most to an automobile risk. The attack vector is dimensionally reduced by principal component analysis, so that the analysis is fast and operable. It constructs a key impact risk of each class by cluster analysis and Chi-square analysis in each class, to form a risk set. An attack path and a test case are constructed based on a risk set, so as to construct test case to be detected.

7 Claims, 2 Drawing Sheets

S101: inputting a risk assessment result of a concept layer of a detected automobile, and constructing attack vectors of the risk assessment result for multi-dimensional information of the risk assessment result S102: performing cluster analysis on the attack vectors, obtaining clustered attack vector class clusters, and calculating a mean of each of the attack vector class clusters to obtain cluster eigenvector means S103: performing Chi-square test on the attack vector and the cluster eigenvector mean of a corresponding class to obtain a risk matching term set S104: constructing a corresponding attack mode in the risk matching term set into an attack test case set that acts on the detected automobile

(56) References Cited

U.S. PATENT DOCUMENTS

2024/0070291 A1* 2/2024 Lee .................. G06F 21/567
2025/0005169 A1* 1/2025 Davidovich ....... G06Q 10/0635

FOREIGN PATENT DOCUMENTS

| CN | 112733146 A | 4/2021 |
|---|---|---|
| CN | 114815605 A | 7/2022 |
| RU | 172615 U1 | 7/2017 |

OTHER PUBLICATIONS

Notice of Grant in Corresponding Chinese Application No. 202310081916.3, dated Apr. 22, 2023; 3 pgs.
Notification to Grant Patent Right for Invention in Chinese Application No. 202310081916.3 mailed on Apr. 22, 2023, 4 pages.
First Office Action in Chinese Application No. 202310081916.3 mailed on Apr. 14, 2023, 11 pages.
He, Ke et al., An Attack Scenario Based Approach to Security Test Generation, Journal of Tianjin University, 2011, 11 pages.

* cited by examiner

METHOD, SYSTEM AND DEVICE FOR GENERATING TEST CASE FOR AUTOMOTIVE CYBERSECURITY DETECTION

RELATED APPLICATIONS

The present application claims priority from Chinese Application Number 202310081916.3, filed Feb. 6, 2023, the disclosure of which is hereby incorporated by reference herein in its entirety.

FIELD

The present disclosure relates to a field of computer technology, and in particular, to a method, system and device for generating test cases for automotive network security detection specified in UNECE R155 regulations.

BACKGROUND

Network has brought production and life into the age of Internet of Things (IoT), which is a network enabling all ordinary physical objects that can be independently addressed to realize interconnection and interworking based on information automobileriers, such as Internet, traditional telecommunication network, etc. The Internet of Things is the third wave of the development of the world information industry after the computer and the Internet. Therefore, more and more industries and enterprises are investing in an innovation of the Internet of Things technology.

With a rapid development of the society, transportation is more and more convenient. Convenient and free private automobiles have gradually been popularized, and the automobile industry has developed rapidly, which has promoted the birth and vigorous development of the Internet of Automobiles and intelligent connected automobiles. Automakers provide more convenient and novel functions for automobiles with the convenient Internet, from initial automobile navigation and anti-theft tracking to popular automatic driving, remote upgrade and intelligent traffic management, and the like, automobiles have been gradually connected to the Internet. Juniper Research data shows that by 2023, 475 million automobiles will be connected via telematics or in-automobile applications, a significant increase from 330 million in 2018. In recent years, the intelligent networked automobile is considered to be one of the areas with the most industrial potential and the most clear market demand in the Internet of Things system, and is an important direction of deep integration of informatization and industrialization. It has the characteristics of wide application space, large industry potential and strong social benefit, and has great significance for promoting the innovation and development of automobile and information communication industry, constructing the new mode of automobile and traffic service, promoting the automatic driving technology innovation and application, and improving the traffic efficiency and safety level. 11 ministries, such as the State Development and Reform Commission and the Central Information Office, recently issued the Strategy of Smart Automobile Development, pointing out that Smart Automobile has become the strategic direction of the development of the global automobile industry, and the development of Smart Automobile has important strategic significance for our country.

However, while the automobile obtains the convenient service via the Internet, it also bears the security risk of the network attack. For network security, each new service and function introduces additional risks and entry points. With the growth of networked automobiles and smart mobile services, there is an increasing number of network, fraud and data breach incidents that will threaten the business and consumers. Hackers can hack into automobiles through networks, disturb in-automobile communication networks, and even achieve remote control of automobiles by resolving in-automobile network communication protocols. In 2015, Charlie Miller and Chris Valasek successfully remotely hacked into a jeep and could remotely control air conditioning, wipers and even accelerators and brakes of the automobile, which could seriously affect the personal safety of drivers and passengers, causing the company to recall 1.4 million automobiles. In 2016, Baidu security personnel successfully hacked into T-BOX, and tampered with the transmission data by hijacking the serial port protocol data between ARMs and MCUs to realize automobile control. The number of automotive network security incidents has increased dramatically over the past 10 years. In 2019 alone, this number doubled. As more and more networked automobiles travel on the road, the potential damage to each accident is rising, putting automakers and consumers at risk.

SUMMARY

In order to address the defects that a test case of a current network automobile is not scientific and the test content is not comprehensive and objective, the present disclosure protects a method, system and device for generating test case for automotive cybersecurity detection.

According to a first aspect of the present disclosure, the present disclosure protects a method for generating test case for automotive cybersecurity detection, comprising:

inputting a risk assessment result of a concept layer of a detected automobile, and constructing attack vectors of the risk assessment result for multi-dimensional information of the risk assessment result;

performing cluster analysis on the attack vectors, obtaining clustered attack vector class clusters, and calculating a mean of each of the attack vector class clusters to obtain cluster eigenvector means;

performing Chi-square test on the attack vector and the cluster eigenvector mean of a corresponding class to obtain a risk matching term set;

constructing a corresponding attack mode in the risk matching term set into an attack test case set that acts on the detected automobile;

the risk assessment result is a detected data item extracted by a TARA report;

the multi-dimensional information includes hazard impact rating, attack feasibility and risk value of the risk assessment result;

the attack vector constructs a triplet vector based on information value of the multi-dimensional information in the risk assessment result;

performing Chi-square test on the attack vector and the cluster eigenvector mean of a corresponding class to obtain a risk matching term set comprises:

performing the Chi-square test on the attack vector and the cluster eigenvector mean of the corresponding class to obtain a Chi-square value;

when the Chi-square value is less than a difference threshold, listing the risk assessment result corresponding to the attack vector as a risk matching term, otherwise, discarding the attack vector;

forming all risk matching terms into a risk matching term set after all the attack vectors complete the chi-square test;

constructing a corresponding attack mode in the risk matching term set into an attack test case set that acts on the detected automobile comprises:

extracting each attack vector in the risk matching set to obtain an attack path of the attack vector;

performing semantic processing on the attack path to obtain attack steps, and summarizing the attack steps to obtain a test case set.

According to a second aspect of the present disclosure, the present disclosure protects a system for generating test case for automotive cybersecurity detection, comprising:

a vector constructing module, configured to input a risk assessment result of a concept layer of a detected automobile, and construct attack vectors of the risk assessment result for multi-dimensional information of the risk assessment result;

a clustering module, configured to perform cluster analysis on the attack vectors, obtain clustered attack vector class clusters, and calculate a mean of each of the attack vector class clusters to obtain cluster eigenvector means;

a Chi-square test module, configured to perform Chi-square test on the attack vector and the cluster eigenvector mean of a corresponding class to obtain a risk matching term set;

a test case constructing module, configured to construct a corresponding attack mode in the risk matching term set into an attack test case set that acts on the detected automobile;

the vector constructing module further comprises:

the risk assessment result is a detected data item extracted by a TARA report;

the multi-dimensional information includes hazard impact rating, attack feasibility and risk value of the risk assessment result;

the attack vector constructs a triplet vector based on information value of the multi-dimensional information in the risk assessment result;

the chi-square test module is further configured to:

perform the Chi-square test on the attack vector and the cluster eigenvector mean of the corresponding class to obtain a Chi-square value;

when the Chi-square value is less than a difference threshold, list the risk assessment result corresponding to the attack vector as a risk matching term, otherwise, discard the attack vector;

form all risk matching terms into a risk matching term set after all the attack vectors complete the chi-square test;

the test case constructing module is further configured to:

extract each attack vector in the risk matching set to obtain an attack path of the attack vector;

perform semantic processing on the attack path to obtain attack steps, and summarize the attack steps to obtain a test case set.

According to a third aspect of the present disclosure, the present disclosure protects a device for generating test case for automotive cybersecurity detection, comprising: a memory and a processor; the memory is configured to store a computer-executable program, the processor reads and executes a part of or all computer-executable program from the memory, and the processor implements the device for generating test case for automotive cybersecurity detection when executing the part of or all computer-executable program.

The disclosure provides a method, a system and a device for generating test case for automotive cybersecurity detection, which are mainly for regulatory detection of automotive cybersecurity, and applicable to automobile security detection and authentication based on an automotive cybersecurity development flow. The present disclosure constructs an attack vector by splitting an impact parameter of a risk to determine a vector value that contributes most to an automobile risk. The attack vector is dimensionally reduced by principal component analysis, so that the analysis is fast and operable. It constructs a key impact risk of each class by cluster analysis and Chi-square analysis in each class, to form a risk set. An attack path and a test case are constructed based on a risk set, so as to construct test case to be detected. The use case construction scheme adopted in the present disclosure for realizing the whole vehicle cybersecurity is able to obtain the risk of the entire vehicle with the highest risk rate and contribution rate at the least cost, thus realizing low-cost and rapid testing, which is suitable for detecting and certification testing for the whole vehicle.

DETAILED DESCRIPTION

Figure 1:
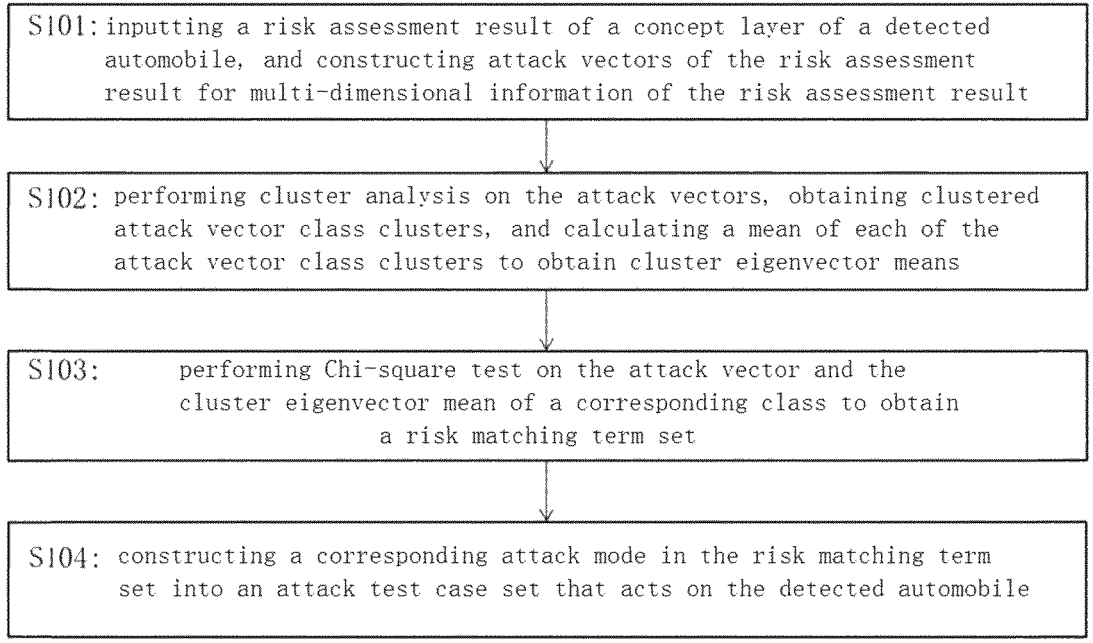
FIG. 1 is a first working flowchart of a method for generating test case for automotive cybersecurity detection according to the present disclosure.

Exemplary embodiments of the present disclosure will be described in more detail below with reference to the accompanying drawings. It is to be understood that terms "first," "second," and the like, as used herein, may be used to describe various elements, but these elements are not limited to these terms unless specifically stated otherwise. These terms are used only to distinguish a first element from another element. While exemplary embodiments of the present disclosure are shown in the drawings, it is to be understood that the disclosure may be implemented in various forms and should not be limited to the embodiments set forth herein. Rather, these embodiments are provided to enable a more thorough understanding of the present disclosure and to convey the scope of the disclosure to those skilled in the art as a whole.

WP29 issued UNECE Regulation No. 155 "Automotive Network Security Management System and Network Security" (hereinafter referred to as "R155"), EU, Japan, and other 1958 States Parties enforced the new automobile model in July 2022. China is also developing the mandatory standard "Technical Requirements and Test Methods for Automobile Information Security", the architecture and core content of which are the same as those of R155. Under the requirements of international and domestic laws and regulations, the automobile export of enterprises faces the test of network security inspection and certification.

At present, Great Wall, Chang'an, Chery and other enterprises have larger automobile exports, and the subsequent export of automobiles will become one of the directions of automobile industry development. However, with the implementation of the R155, it is required that the automobile exporting the EU must have a network security authentication, including a system authentication and a model network security authentication. At present, Germany, Netherlands, and other countries have issued implementation rules, and for the requirements of R155, a method for constructing a network security test case is still lacking.

An object of the present disclosure is to provide a method for generating test case for automotive cybersecurity detection, so as to solve the problems existing in the above prior art, and to satisfy generation of test cases for automobile enterprises, parts manufacturers, automobile detection organizations, and the like in automotive cybersecurity detection.

According to a first embodiment of the present disclosure, referring to FIG. 1, the present disclosure protects a method for generating test case for automotive cybersecurity detection, comprising:

S101: inputting a risk assessment result of a concept layer of a detected automobile, and constructing attack vectors of the risk assessment result for multi-dimensional information of the risk assessment result;

S102: performing cluster analysis on the attack vectors, obtaining clustered attack vector class clusters, and calculating a mean of each of the attack vector class clusters to obtain cluster eigenvector means;

S103: performing Chi-square test on the attack vector and the cluster eigenvector mean of a corresponding class to obtain a risk matching term set;

S104: constructing a corresponding attack mode in the risk matching term set into an attack test case set that acts on the detected automobile.

Further, S101 specifically includes:
The risk assessment result is a detected data item extracted by a TARA report;
The multi-dimensional information includes hazard impact rating, attack feasibility and risk value of the risk assessment result;
The attack vector constructs a triplet vector based on information value of the multi-dimensional information in the risk assessment result.

The risk assessment result includes at least an attack path, a threat scenario, a risk value, an attack feasibility, and an attack mode.

In this embodiment, asset values, impact values, attack values, and risk preset values of the risk assessment result are clustered by using the risk assessment result of the detected automobile in the development process. The asset values determine an asset value vector according to the contribution value to automobile safety, energy conservation, environmental protection, and anti-theft in conceptual design. The impact values construct an impact value vector according to four aspects of an internal interface, a physical connection interface, a short-range communication, and an external communication before clustering. The attack feasibility constructs an attack feasibility vector according to the attack vector, an attack complexity, a right requirement, and a user interaction.

Preferably, the impact values include options for threat scenarios, expertise, product openness, opportunity windows, attack equipment, threat levels, functional security, financial loss, operability, privacy regulations, and the like.

Further, before S102, the method further includes:
S1020: performing principal component analysis on the attack vectors, performing dimension reduction on the vector values of the attack vectors, and obtaining key attack vectors after the dimension reduction.

The principal component analysis is calculated by following steps:
(1) Suppose that there are m n-dimensional attack vector samples $X=(x_1, x_2, x_3 \ldots, x_m)$, the goal is to reduce data of the original attack vector to k-dimension, and then use the reduced-dimensional data to complete the cluster analysis.
(2) The attack vectors are first formed into an n-row, m-column matrix X by columns, and then a mean of each dimension in X is subtracted from data of the dimension to obtain X'. (it is equivalent to "centralizing" all samples, i.e., $$x_i = x_i - \frac{1}{m}\sum_{j=1}^{m} x_j,$$

then the data being organized into an n-row, m-column matrix X' by columns).
(3) Calculating covariance matrix of samples $$C = \frac{1}{m}X'X'^T.$$

(4) (Eigenvalue decomposition or singular value decomposition) the eigenvalue of the covariance matrix and the corresponding eigenvector are solved.
(5) The eigenvectors are arranged to a matrix in rows from top to bottom according to sizes of respective eigenvalues, and the first k rows are taken to for matrix P.
(6) Y=PY is the data of the attack vector after dimension reduction to k dimension.

Figure 2:
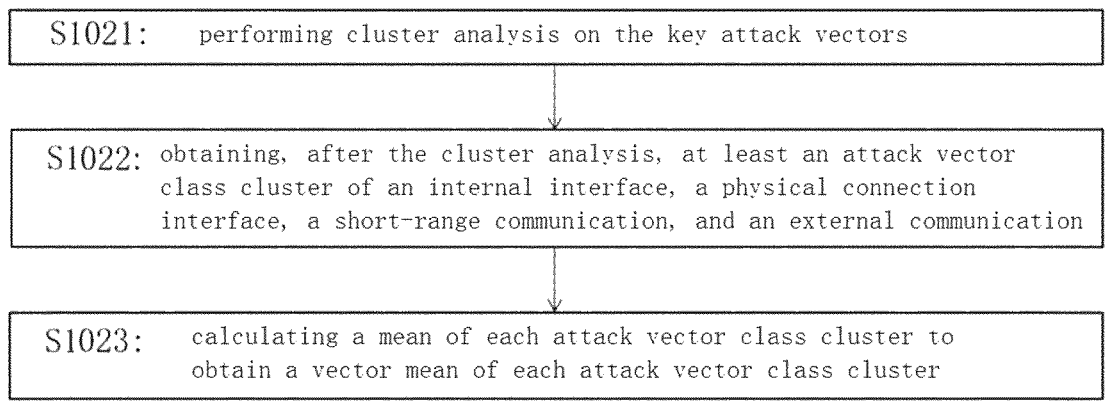
FIG. 2 is a second working flowchart of a method for generating test case for automotive cybersecurity detection according to the present disclosure.

Further, referring to FIG. 2, S102 specifically includes:
S1021: performing cluster analysis on the key attack vectors;
using a K-means clustering algorithm in the cluster analysis.
S1022: obtaining, after the cluster analysis, at least an attack vector class cluster of an internal interface, a physical connection interface, a short-range communication, and an external communication.
S1023: calculating a mean of each attack vector class cluster to obtain a vector mean of each attack vector class cluster.

The K-means clustering algorithm adopted by the cluster analysis algorithm is an iterative cluster analysis algorithm. It randomly selects A attack vectors as initial cluster centers, then calculates the distance between each attack vector and each seed cluster center, and assigns each attack vector to the nearest cluster center.

The cluster center and the attack vector assigned to the cluster center represent a cluster. Each time a sample is assigned, the cluster centers of the clusters are recalculated from existing attack vectors in the clusters, and the process is repeated until a certain termination condition is satisfied.

The termination condition may be that no (or a minimum number) attack vectors are reassigned to different clusters, no (or a minimum number) cluster centers are changed again, and the sum of the error squares is locally minimum.

Figure 3:
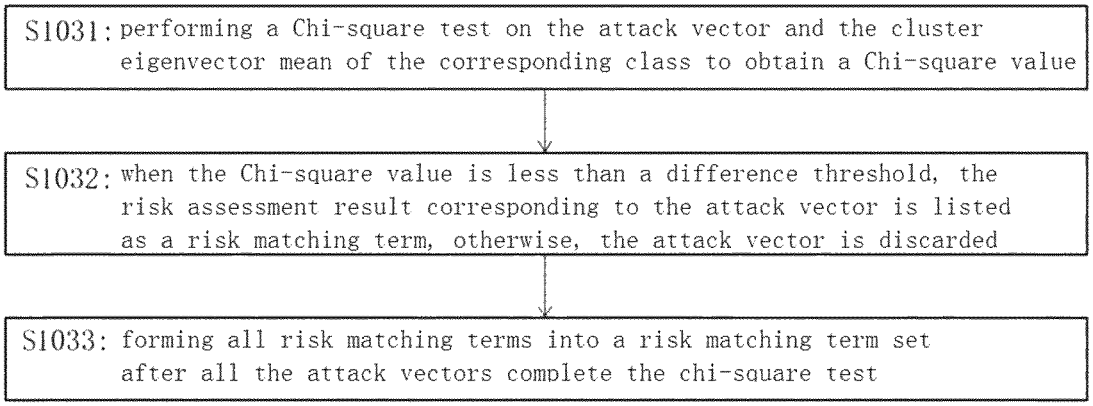
FIG. 3 is a third working flowchart of a method for generating test case for automotive cybersecurity detection according to the present disclosure according to the present disclosure.

Further, referring to FIG. 3, S103 includes:

S1031: performing a Chi-square test on the attack vector and the cluster eigenvector mean of the corresponding class to obtain a Chi-square value.

S1032: when the Chi-square value is less than a difference threshold, the risk assessment result corresponding to the attack vector is listed as a risk matching term, otherwise, the attack vector is discarded.

S1033: Forming all risk matching terms into a risk matching term set after all the attack vectors complete the chi-square test.

Basic formula of the Chi-square test:

$$\chi^2 = \sum_0^K \frac{(f_0 - f_e)^2}{f_e} \sim \chi^2(df)$$

$$df = K - M$$

In which: K is the number of clusters;

$f_0$ is an attack vector value;

$f_e$ is the mean of the eigenvectors;

M is the number of constraints or the number of sample statistics used with observation data.

It sets a difference threshold to be 0.1.

Specifically, the Chi-square coefficient of the attack vector and the cluster eigenvector mean is calculated. When the Chi-square coefficient is less than 0.1, it indicates that the similarity between the attack vector and the vector mean of the class cluster of the corresponding class is high. Then, the attack path corresponding to the risk is set to the test case of the cluster, and the test case set formed by each cluster is the constructed test case set.

Further, S104 specifically includes:

S1041: extracting each attack vector in the risk matching set to obtain an attack path of the attack vector.

S1042: performing semantic processing on the attack path to obtain attack steps, and summarizing the attack steps to obtain a test case set.

In the present embodiment, the attack paths of the involved partial attack vectors and the threats are exemplified:

Attack Vector 1:
Threat description: Tampering with identity and configuration data through a network attack or an ECU attack;
Attack path: the identity and the configuration information of the automobile are illegally tampered and the automobile function is changed in an abnormal situation;
Example of the attack path: Ecall number or the contact telephone number is tampered, the emergency call cannot be connected, and the rescue cannot be performed in time.

Attack Vector 2:
Threat description: Removing identity and configuration data through a network attack or an ECU attack;
Attack path: The identity and configuration information of the automobile cannot be acquired or used, resulting in loss of the automobile basic function;
Example of attack path: Ecall number or the contact telephone number is deleted, so that the emergency call cannot be connected, and the rescue cannot be performed in time.

Attack Vector 3:
Threat description: Obtaining program and algorithm information through a network attack or an ECU attack;
Attack path: Parts firmware and application acquired by unauthorized attackers, resulting in loss of intellectual property and automobile functions, etc.;
Example of attack path: An attacker illegally obtains firmware or applications through refresh means, and understands internal algorithm design and code implementation.

Attack Vector 4:
Threat description: Tampering with automobile control programs and applications through a network attack or an ECU attack;
Attack path: Parts firmware and applications are illegally tampered with by the attacker, and automobile functions are hijacked by the attacker;
Example of attack path: The attacker tampers with the Ecall firmware and changes the function, which directly affected a driving security of the automobile.

Attack Vector 5:
Threat description: Removing automobile control programs or applications through a network attack or an ECU attack;
Attack path: Parts firmware and applications cannot be acquired or used, causing ECU to be unable to upgrade or application function abnormal;
Example of attack path: The attacker deletes the Ecall firmware, the Ecall function cannot be implemented, the emergency call cannot be connected, and the rescue cannot be performed in time.

Attack Vector 6:
Threat description: Acquiring automobile or user data through a network attack or an ECU attack;
Attack path: Automobile data and user data are acquired by an unauthorized attacker, causing loss to an automobile owner or an automobile factory;
Example of attack path: Ecall function log information is acquired by an illegal user, and an attacker can grasp the contents of the log when an emergency occurs.

Attack Vector 7:
Threat description: Tampering with automobile or user data through a network attack or an ECU attack;
Attack path: Automobile data and user data are illegally tampered with by an attacker, so that related information cannot be traced back, or related functions cannot be used normally;
Example of attack path: Automobile position information is illegally changed, causing automobile addressing error. The log information is illegally tampered with, resulting in incorrect forensics on vehicle issues.

Attack Vector 8:
Threat description: Tampering with automobile or user data through a network attack or an ECU attack;
Attack path: Automobile data and user data cannot be acquired or used, and related information and functions cannot be traced and used.
Example of attack path: Ecall function log is illegally deleted, resulting in no relevant data at the time of event investigation.

Attack Vector 9:
Threat description: Tampering with communication commands and signals through a network attack or an ECU attack;
Attack path: Automobile control instruction and automobile status information are illegally tampered with by an attacker, and related functions are hijacked by the attacker.

Example of attack path: The attacker tampers with information transmitted by the Ecall, such as positioning information, resulting in positioning errors.

Attack Vector 10:
Threat description: Blocking communication commands and signals through a network attack or an ECU attack;
Attack path: Automobile control command and automobile status information cannot be acquired or used, and related functions cannot be normally used;
Example of attack path: The attacker attacks the communication network, the communication of the Ecall cannot be connected, and the rescue cannot be performed in time.

Attack Vector 11:
Threat description: Tampering with identity and configuration data through a network attack or an ECU attack;
Attack path: identity and the configuration information of the automobile are illegally tampered with and the automobile function is changed in an abnormal situation;
Example of attack path: Tampering of Intelligent Driving Configuration Parameters, resulting in economic loss in automobile factory sales, and bringing potential claims.

Attack Vector 12:
Threat description: Removing identity and configuration data through a network attack or an ECU attack;
Attack path: The identity and configuration information of the automobile cannot be acquired or used, resulting in loss of the automobile basic function;
Example of attack path: Erasing the intelligent driving configuration parameter, causing the automobile to fail to start or the function to fail to occur.

Attack Vector 13:
Threat description: Obtaining program and algorithm information through a network attack or an ECU attack;
Attack path: parts firmware and applications are acquired by unauthorized attackers, resulting in loss of intellectual property and automobile functions, etc.
Example of attack path: Attacker illegally obtains the firmware of intelligent assistant driving, reversely obtains the relevant algorithm, resulting in the loss of enterprise intellectual property.

Attack Vector 14:
Threat description: Tampering with automobile control programs and applications through a network attack or an ECU attack;
Attack path: Parts firmware and applications are illegally tampered with by an attacker, causing automobile functions to be hijacked by the attacker;
Example of attack path: The attacker tampers with firmware of the intelligent assistant driving, directly affecting the safe driving of the automobile.

Attack Vector 15:
Threat description: Removing automobile control programs or applications through a network attack or an ECU attack;
Attack path: Parts firmware and applications cannot be acquired or used, causing ECU to be unable to upgrade or application function abnormal;
Example of attack path: The attacker deletes the firmware and application of the intelligent driving assistant function, so the intelligent assistant driving function of the automobile cannot be used.

Attack Vector 16:
Threat description: Acquiring automobile or user data through a network attack or an ECU attack;
Attack path: Automobile data and user data are acquired by an unauthorized attacker, causing loss to an automobile owner or an automobile factory;
Example of attack path: The log information of the self-driving is acquired by the illegal user, unilaterally or inaccurately interpreted, resulting in the error responsibility and compensation judgment of the automobile accident scene.

In a specific application scenario of this embodiment, an TARA report is output from a project of a certain automobile model. The detection data item containing TARA is 91, and each entry contains three values of an impact rating (Impactrating), an attack feasibility (TargetThreatFeasibility) and a risk result (Riskvalue) of a risk assessment result. An attack vector of the risk assessment result is formed by the order of the three values. For example, the attack vector of the first risk assessment result of the ecall is (2, 1, 2), and the attack vector of the second risk assessment result of the ecall is (3, 1, 1). 91 risk assessment result entries constitute attack vectors of the current component.

A K-means clustering analysis is performed on 91 attack vectors, and the 91 attack vector entries are divided into four major classes, a first class of 32 attack vector entries, a second class of 41 attack vector entries, a third class of 11 attack vector entries, and a fourth class of 7 attack vector entries. For each class, the attack vector means are calculated. The first class means are (3,2,2), the second class means are (3,1,1), the third class means are (4,3,4), and the fourth class means are (5,4,5). The attack vectors of each of the four classes are respectively subjected to the Chi-square test with the vector means of the respective classes. For example, the first attack vector entry (2, 1, 2) of the first class and the first class means (3, 2, 2) are subjected to a Chi-square test. If the Chi-square value is less than 0.1, the first attack vector entry is considered to be an optional risk item. Convert the attack path method for this risk item to a test case. And it forms a first class of test case subset after the Chi-square test for the first class is completed. After the four classes of test case subsets are constructed, an automobile type test case set is formed.

The risk assessment results of TARA report for the partial attack vectors are given below:
Attack vector 1:
Impactrating: Medium (2);
TargetThreatFeasibility: VeryLow (1);
Riskvalue: Low (2);
Attack vector 2:
Impactrating: Medium (2);
TargetThreatFeasibility: VeryLow (1);
Riskvalue: Low (2);
Attack vector 3:
Impactrating: Low (1);
TargetThreatFeasibility: Medium (3);
Riskvalue: Low (2);
Attack vector 4:
Impactrating: High (3);
TargetThreatFeasibility: VeryLow (1);
Riskvalue: Medium (3);
Attack vector 5:
Impactrating: High (3);
TargetThreatFeasibility: VeryLow (1);
Riskvalue: Medium (3);
Attack vector 6:
Impactrating: Low (1);
TargetThreatFeasibility: Medium (3);
Riskvalue: VeryLow (1);

Attack vector 7:
Impactrating: Low (1);
TargetThreatFeasibility: Medium (3);
Riskvalue: VeryLow (1);
Attack vector 8:
Impactrating: Low (1);
TargetThreatFeasibility: Medium (3);
Riskvalue: VeryLow (1);
Attack vector 9:
Impactrating: Low (1);
TargetThreatFeasibility: Medium (3);
Riskvalue: VeryLow (1);
Attack vector 10:
Impactrating: Low (1);
TargetThreatFeasibility: Medium (3);
Riskvalue: VeryLow (1);
Attack vector 11:
Impactrating: Medium (2);
TargetThreatFeasibility: VeryLow (1);
Riskvalue: Low (2);
Attack vector 12:
Impactrating: Medium (2);
TargetThreatFeasibility: VeryLow (1);
Riskvalue: Low (2);
Attack vector 13:
Impactrating: Low (1);
TargetThreatFeasibility: Medium (2);
Riskvalue: VeryLow (1);
Attack vector 14:
Impactrating: Critical (4);
TargetThreatFeasibility: VeryLow (1);
Riskvalue: High (4);
Attack vector 15:
Impactrating: Medium (2);
TargetThreatFeasibility: VeryLow (1);
Riskvalue: Low (1);
Attack vector 16:
Impactrating: High (3);
TargetThreatFeasibility: VeryLow (1);
Riskvalue: Medium (2).

Figure 4:
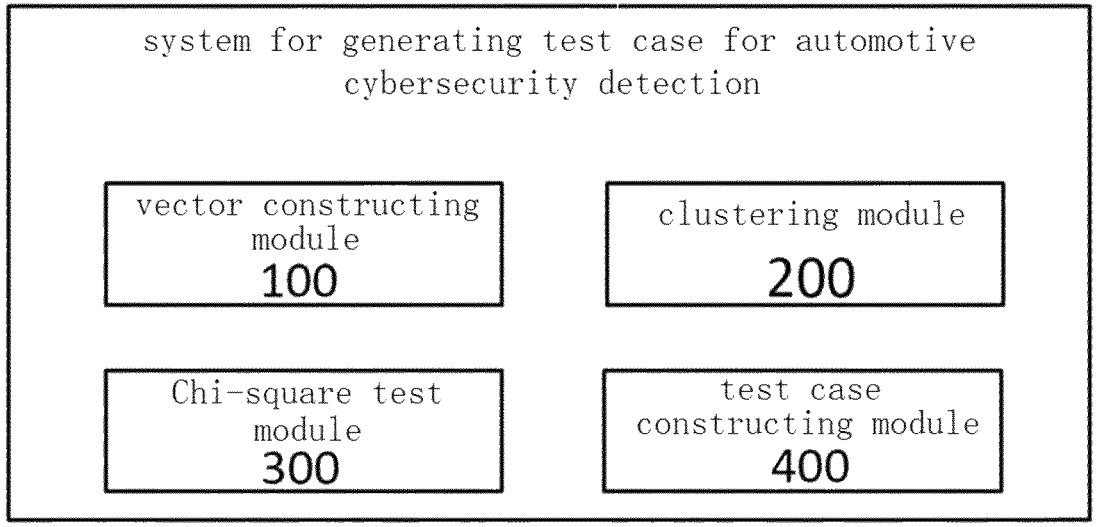
FIG. 4 is a structural module diagram of a system for generating test case for automotive cybersecurity detection according to the present disclosure according to the present disclosure.

According to a second embodiment of the present disclosure, referring to FIG. 4, the present disclosure sets forth a system for generating test case for automotive cybersecurity detection, comprising:

A vector constructing module 100, configured to input a risk assessment result of a concept layer of a detected automobile, and construct attack vectors of the risk assessment result for multi-dimensional information of the risk assessment result.

A clustering module 200, configured to perform cluster analysis on the attack vectors, obtain clustered attack vector clusters, and calculate a mean of each of the attack vector class clusters to obtain cluster eigenvector means.

A Chi-square test module 300, configured to perform Chi-square test on the attack vector and the cluster eigenvector mean of a corresponding class to obtain a risk matching term set.

A test case constructing module 400, configured to construct a corresponding attack mode in the risk matching set into an attack test case set acting on the detected automobile.

Further, the vector constructing module 100 further includes:
 The risk assessment result is a detected data item extracted by a TARA report;
 The multi-dimensional information includes hazard impact rating, attack feasibility and risk value of the risk assessment result;
 The attack vector constructs a triplet vector based on the information value of the multi-dimensional information in the risk assessment result.

Further, the system further comprises:
A dimension reduction module, configured to perform principal component analysis on the attack vector, perform dimension reduction on vector values of the attack vectors, and obtain key attack vectors after the dimension reduction;
The clustering module 200 is further configured to:
Perform cluster analysis on the key attack vectors;
Use a K-means clustering algorithm in the cluster analysis;
Obtain, after the cluster analysis, at least an attack vector class cluster of an internal interface, a physical connection interface, a short-range communication, and an external communication;
Calculate a mean of each attack vector class cluster to obtain a vector mean of each attack vector class cluster.

Further, the chi-square test module 300 is further configured to:
 perform a Chi-square test on the attack vector and the cluster eigenvector mean of the corresponding class to obtain a Chi-square value;
 when the Chi-square value is less than a difference threshold, the risk assessment result corresponding to the attack vector is listed as a risk matching term, otherwise, the attack vector is discarded;
 after all attack vectors have completed the Chi-square test, form all risk matching terms into a risk matching set.

The test case constructing module 400 is further configured to:
 extract each attack vector in the risk matching set to obtain an attack path of the attack vector;
 perform semantic processing on the attack path to obtain attack steps, and summarize the attack steps to obtain a test case set.

Figure 5:
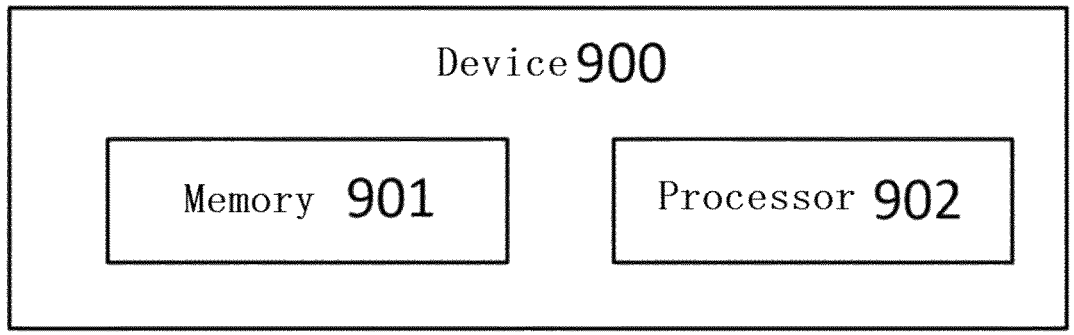
FIG. 5 is a system structure diagram of a device according to the present disclosure.

According to a third embodiment of the present disclosure, referring to FIG. 5, the present disclosure also protects a device 900 including a memory 901 and a processor 902. The memory 901 is configured to store a computer-executable program. The processor 902 reads and executes a part of or all computer-executable programs from the memory 901. The processor 902 implements a method for generating test case for automotive cybersecurity detection when executing the part or all computer-executable programs.

It will be appreciated by those skilled in the art that various modifications and improvements may occur to the disclosure. For example, the various devices or components described above may be implemented by hardware, software, firmware, or a combination of some or all of the three.

A flowchart is used in the present disclosure to illustrate the steps of a method according to an embodiment of the present disclosure. It is to be understood that the preceding or following steps do not necessarily proceed exactly in order. Instead, the various steps may be processed in reverse order or simultaneously. At the same time, other operations may also be added to these processes.

It will be appreciated by those skilled in the art that all or a portion of the steps of the above-described methods may be performed by a computer program instructing relevant hardware. The program may be stored in a computer-readable storage medium, such as a read-only memory, a magnetic disk, an optical disk, or the like. Alternatively, all or part of the steps of the above embodiments may be implemented using one or more integrated circuits. Accordingly, the modules/units in the above embodiments may be implemented in the form of hardware or in the form of software functional modules. The present disclosure is not limited to any particular form of a combination of hardware and software.

Unless defined otherwise, all terms used herein have the same meaning as commonly understood by those skilled in the art to which this disclosure belongs. It is also to be understood that terms such as those defined in a general dictionary should be interpreted to have a meaning consistent with their meaning in the context of the related art, without applying an idealized or extremely formal meaning unless explicitly so defined herein.

The foregoing is illustrative of the present disclosure and should not be considered as limiting. While several exemplary embodiments of the present disclosure have been described, those skilled in the art will readily appreciate that many modifications may be made to the exemplary embodiments without departing from the novel teachings and advantages of the present disclosure. Accordingly, all such modifications are intended to be included within the scope of the present disclosure as defined by the appended claims. It is to be understood that the foregoing is illustrative of the present disclosure and should not be considered as limiting to the particular embodiments disclosed, and that modifications to the disclosed and other embodiments are intended to be included within the scope of the appended claims. This disclosure is defined by the claims and their equivalents.

In the description, terms "an embodiment", "some embodiments", "illustrative embodiments", "examples", "specific examples", or "some examples", etc. means that a particular feature, structure, material, or characteristic described in connection with the embodiment or example, is included in at least one embodiment or example of the present disclosure. In the present description, the schematic representation of the above terms does not necessarily refer to the same embodiments or examples. Moreover, the specific features, structures, materials, or features described may be combined in any one or more embodiments or examples in a suitable manner.

While embodiments of the present disclosure have been shown and described, it will be understood by those skilled in the art that various changes, modifications, substitutions and variations may be made to these embodiments without departing from the principles and spirit of the disclosure, the scope of which is defined by the claims and their equivalents.

The invention claimed is:

1. A method for generating test case for automotive cybersecurity detection, implemented by a processor, the method comprising:
inputting a risk assessment result of a concept layer of a detected automobile, and constructing attack vectors of the risk assessment result for multi-dimensional information of the risk assessment result;
performing principal component analysis on the attack vectors, performing dimension reduction on the vector values of the attack vectors, and obtaining key attack vectors after the dimension reduction;
performing cluster analysis on the attack vectors, obtaining a clustered attack vector class cluster, and calculating a mean of the attack vector class cluster to obtain a cluster eigenvector mean, comprising:
performing the cluster analysis on the key attack vectors;
using a K-means clustering algorithm in the cluster analysis, the cluster analysis including:
randomly selecting a plurality of attack vectors as initial cluster centers;
determining a distance between each of the plurality of attack vectors and each seed cluster center; and
assigning each of the plurality of attack vectors to a nearest cluster center;
wherein
the cluster center and the attack vector assigned to the nearest cluster center represent a cluster; each time a sample is assigned, the cluster center of the cluster is recalculated from existing attack vectors in the cluster;
the cluster analysis is repeated until a termination condition is satisfied; the termination condition includes that a minimum number of attack vectors are reassigned to different clusters, a minimum number of cluster centers are changed again, and a sum of error squares is locally minimum;
obtaining, after the cluster analysis, at least an attack vector class cluster of an internal interface, a physical connection interface, a short-range communication, and an external communication; and
calculating a mean of each attack vector class cluster to obtain a vector mean of the each attack vector class cluster;
performing Chi-square test on the attack vector and the cluster eigenvector mean of a corresponding class to obtain a risk matching term set;
constructing a corresponding attack mode in the risk matching term set into an attack test case set that acts on the detected automobile; wherein
the risk assessment result is a detected data item extracted by a threat analysis and risk assessment (TARA) report;
the multi-dimensional information includes hazard impact rating, attack feasibility and risk value of the risk assessment result; and
the attack vector constructs a triplet vector based on information value of the multi-dimensional information in the risk assessment result;
performing Chi-square test on the attack vector and the cluster eigenvector mean of a corresponding class to obtain a risk matching term set, comprising:
performing the Chi-square test on the attack vector and the cluster eigenvector mean of the corresponding class to obtain a Chi-square value;
when the Chi-square value is less than a difference threshold, listing the risk assessment result corresponding to the attack vector as a risk matching term, otherwise, discarding the attack vector; and
forming all risk matching terms into a risk matching term set after all the attack vectors complete the chi-square test;
constructing an attack test case set that acts on the detected automobile based on a corresponding attack mode in the risk matching term set, comprising:
extracting each attack vector in the risk matching set to obtain an attack path of the attack vector; and
performing semantic processing on the attack path to obtain attack steps, and summarizing the attack steps to obtain a test case set, wherein the test case set is applicable to automobile security detection and authentication based on an automotive cybersecurity development flow, to evaluate automotive cybersecurity performance of the detected automobile.

2. The method of claim 1, wherein the attack vector constructs a triplet vector based on information value of the multi-dimensional information in the risk assessment result, comprising:
- clustering asset values, impact values, attack values, and risk preset values of the risk assessment result by using the risk assessment result of the detected automobile in a development process; wherein
- the asset values determine an asset value vector according to contribution values to automobile safety, energy conservation, environmental protection, and anti-theft in conceptual design;
- the impact values construct an impact value vector according to an internal interface, a physical connection interface, a short-range communication, and an external communication before clustering; and
- the attack feasibility constructs an attack feasibility vector according to the attack vector, an attack complexity, a right requirement, and a user interaction.

3. The method of claim 2, wherein a threat of the attack vector and the corresponding attack path comprises at least one of:
- tampering with identity and configuration data through a network attack or an electronic control unit (ECU) attack to control and change automobile function;
- removing the identity and the configuration data through the network attack or the ECU attack, resulting in loss of an automobile basic function;
- obtaining program and algorithm information through the network attack or the ECU attack, resulting in parts of firmware and application acquired by unauthorized attackers;
- tampering with automobile control programs and applications through the network attack or the ECU attack to hijack the automobile function;
- removing the automobile control programs or the applications through the network attack or the ECU attack, causing the ECU to be unable to upgrade or application function to be abnormal;
- acquiring automobile data or user data through the network attack or the ECU attack, so that the automobile data and the user data are acquired by an unauthorized attacker;
- tampering with communication commands and signals through the network attack or the ECU attack;
- hijacking the automobile function related to the tampered communication commands and the signals;
- blocking the communication commands and the signals through the network attack or the ECU attack, and
- cutting off functions related to blocking the communication commands and the signals.

4. A system for generating test case for automotive cybersecurity detection, comprising a memory and a processor, wherein the memory is configured to store computer-executable programs, and in response to determining that the processor reads and executes a part of or all computer-executable programs from the memory, the system is configured to:
- input a risk assessment result of a concept layer of a detected automobile, and construct attack vectors of the risk assessment result for multi-dimensional information of the risk assessment result;
- perform principal component analysis on the attack vectors, perform dimension reduction on the vector values of the attack vectors, and obtain key attack vectors after the dimension reduction;
- perform cluster analysis on the attack vector, obtain a clustered attack vector class cluster, and calculate a mean of the attack vector class cluster to obtain a cluster eigenvector mean, wherein to perform cluster analysis on the attack vector, obtain a clustered attack vector class cluster, and calculate a mean of the attack vector class cluster to obtain a cluster eigenvector mean, the system is further configured to:
- perform the cluster analysis on the key attack vectors;
- use a K-means clustering algorithm in the cluster analysis, the cluster analysis including:
  - randomly selecting a plurality of attack vectors as initial cluster centers;
  - determining a distance between each of the plurality of attack vectors and each seed cluster center; and
  - assigning each of the plurality of attack vectors to a nearest cluster center;
- wherein
  - the cluster center and the attack vector assigned to the nearest cluster center represent a cluster; each time a sample is assigned, the cluster center of the cluster is recalculated from existing attack vectors in the clusters; the cluster analysis is repeated until a termination condition is satisfied; the termination condition includes that a minimum number of attack vectors are reassigned to different clusters, a minimum number of cluster centers are changed again, and a sum of error squares is locally minimum;
- obtain, after the cluster analysis, at least an attack vector class cluster of an internal interface, a physical connection interface, a short-range communication, and an external communication;
- calculate a mean of each attack vector class cluster to obtain a vector mean of the each attack vector class cluster;
- to perform Chi-square test on the attack vector and the cluster eigenvector mean of a corresponding class to obtain a risk matching term set;
- construct a corresponding attack mode in the risk matching term set into an attack test case set that acts on the detected automobile; wherein
  - the risk assessment result is a detected data item extracted by a threat analysis and risk assessment (TARA) report;
  - the multi-dimensional information includes hazard impact rating, attack feasibility and risk value of the risk assessment result;
  - the attack vector constructs a triplet vector based on information value of the multi-dimensional information in the risk assessment result;
- the system is further configured to:
- perform the Chi-square test on the attack vector and the cluster eigenvector mean of the corresponding class to obtain a Chi-square value;
- when the Chi-square value is less than a difference threshold, list the risk assessment result corresponding to the attack vector as a risk matching term, otherwise, discard the attack vector;
- form all risk matching terms into a risk matching term set after all the attack vectors complete the chi-square test;
- the system is further configured to:
- extract each attack vector in the risk matching set to obtain an attack path of the attack vector;
- perform semantic processing on the attack path to obtain attack steps, and summarize the attack steps to obtain a test case set, wherein the test case set is applicable to automobile security detection and authentication based on an automotive cybersecurity development flow, to evaluate the automotive cybersecurity performance of the detected automobile.

5. The system of claim 4, wherein to construct, by attack vector, a triplet vector based on information value of the multi-dimensional information in the risk assessment result, the system is further configured to:

cluster asset values, impact values, attack values, and risk preset values of the risk assessment result by using the risk assessment result of the detected automobile in a development process; wherein the asset values determine an asset value vector according to contribution values to automobile safety, energy conservation, environmental protection, and anti-theft in conceptual design;

the impact values construct an impact value vector according to an internal interface, a physical connection interface, a short-range communication, and an external communication before clustering; and the attack feasibility constructs an attack feasibility vector according to the attack vector, an attack complexity, a right requirement, and a user interaction.

6. The system of claim 5, wherein a threat of the attack vector and the corresponding attack path comprises at least one of:

tampering with identity and configuration data through a network attack or an electronic control unit (ECU) attack to control and change automobile function;

removing the identity and the configuration data through the network attack or the ECU attack, resulting in loss of an automobile basic function;

obtaining program and algorithm information through the network attack or the ECU attack, resulting in parts of firmware and application acquired by unauthorized attackers;

tampering with automobile control programs and applications through the network attack or the ECU attack to hijack the automobile function;

removing the automobile control programs or the applications through the network attack or the ECU attack, causing the ECU to be unable to upgrade or application function abnormal;

acquiring automobile data or user data through the network attack or the ECU attack, so that the automobile data and the user data are acquired by an unauthorized attacker;

tampering with communication commands and signals through the network attack or the ECU attack, and hijacking the automobile function related to the tampered communication commands and the signals; and blocking the communication commands and the signals through the network attack or the ECU attack, and cutting off functions related to blocking the communication commands and the signals.

7. A device for generating test case for automotive cybersecurity detection, comprising: a memory and a processor; the memory is configured to store a computer-executable program, the processor reads and executes a part of or all computer-executable program from the memory, and the processor implements the method for generating test case for automotive cybersecurity detection according to claim 1 when executing the part of or all computer-executable program.

* * * * *